(12) United States Patent
Biber et al.

(10) Patent No.: US 8,447,454 B2
(45) Date of Patent: May 21, 2013

(54) CONTROL METHOD FOR A ROBOT VEHICLE, AND ROBOT VEHICLE

(75) Inventors: Peter Biber, Tuebingen (DE); Amos Albert, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 12/992,756

(22) PCT Filed: Dec. 9, 2008

(86) PCT No.: PCT/EP2008/067112
§ 371 (c)(1),
(2), (4) Date: Feb. 9, 2011

(87) PCT Pub. No.: WO2009/138140
PCT Pub. Date: Nov. 19, 2009

(65) Prior Publication Data
US 2011/0125358 A1  May 26, 2011

(30) Foreign Application Priority Data
May 15, 2008  (DE) .......... 10 2008 001 813

(51) Int. Cl.
| G01C 22/00 | (2006.01) |
| G05D 1/00 | (2006.01) |
| G06F 7/70 | (2006.01) |
| G06F 7/00 | (2006.01) |
| A01D 34/00 | (2006.01) |
| A01D 75/28 | (2006.01) |
| A47L 5/00 | (2006.01) |

(52) U.S. Cl.
USPC ....... 701/25; 701/2; 701/50; 701/56; 56/10.1; 56/10.5; 56/14.7; 15/319

(58) Field of Classification Search
USPC .............................. 56/10.2 A; 15/319; 701/25
See application file for complete search history.

(56) References Cited

U.S. PATENT DOCUMENTS

| 5,109,566 | A | * | 5/1992 | Kobayashi et al. ............. 15/319 |
| 5,416,712 | A | * | 5/1995 | Geier et al. ................... 701/472 |
| 5,696,675 | A | | 12/1997 | Nakamura et al. |
| 5,938,704 | A | * | 8/1999 | Torii ............................... 701/23 |
| 5,998,953 | A | | 12/1999 | Nakamura et al. |
| 6,539,284 | B2 | * | 3/2003 | Nourbakhsh et al. ......... 700/245 |
| 2004/0239756 | A1 | * | 12/2004 | Aliaga et al. .................... 348/36 |

FOREIGN PATENT DOCUMENTS

| DE | 10000919 A1 * | 7/2001 |
| EP | 1 715 399 | 10/2006 |
| GB | 2 277 152 | 10/1994 |

\* cited by examiner

*Primary Examiner* — Fadey Jabr
*Assistant Examiner* — Navdeep Mand
(74) *Attorney, Agent, or Firm* — Merchant & Gould P.C.

(57) ABSTRACT

A method and apparatus for controlling driving means which are designed to steer and move a robot vehicle (3) that is designed as a lawn mowing vehicle. The driving means are controlled so that the robot vehicle (3) travels through several sections (2) of a working area (8) in a specific movement pattern according to a section travel strategy with the help of dead reckoning such that two adjoining course sections (5) overlap with a predefined probability transversely to the direction of travel of the robot vehicle (3).

11 Claims, 1 Drawing Sheet

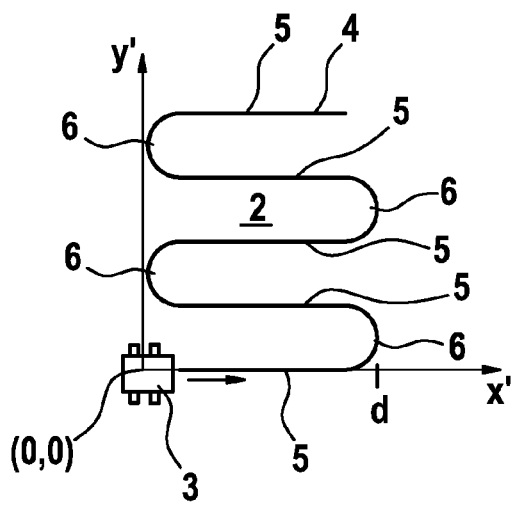
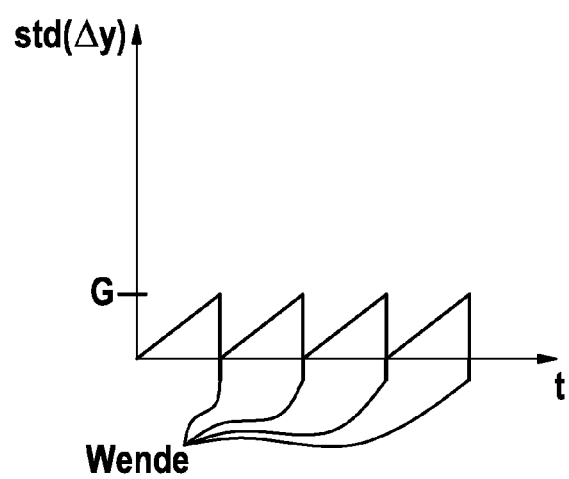
Fig. 1a  Fig. 1b
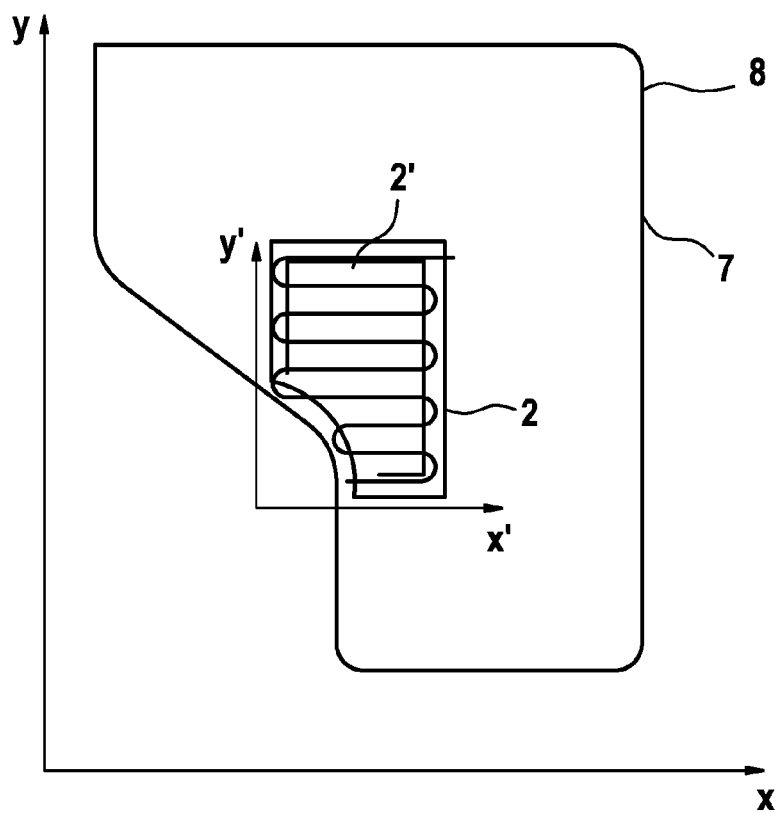
Fig. 2

CONTROL METHOD FOR A ROBOT VEHICLE, AND ROBOT VEHICLE

This application is a National Stage Application of PCT/EP2008/067112, filed 9 Dec. 2008, which claims benefit of Serial No. 10 2008 001 813.9, filed 15 May 2008 in Germany and which applications are incorporated herein by reference. To the extent appropriate, a claim of priority is made to each of the above disclosed applications.

BACKGROUND

The invention relates to a method for controlling driving means which are designed to steer and move a robot vehicle on a working area as well as to a robot vehicle, in particular a lawn mowing vehicle.

Autonomous lawn mowers currently available on the market navigate by means of random navigation. This is fraught with several disadvantages. There is thus no guarantee for a complete coverage of the working area. Numerous traverses by the mower leave the lawn having an unaesthetic appearance. An advantageous global positioning of the robot vehicle having an accuracy with a margin of error less than 5 cm could allow for an optimal travel strategy. Such an accurate positioning nowadays represents, however, a technical barrier. Standard GPS receivers are thus considerably less accurate, and other technologies are too cost intensive and too susceptible to breakdown or require a complex installation, such as for instance the use of known landmarks from the British patent GB 2 277 152 A1.

Controlling autonomous robot vehicles by dead reckoning, i.e. on the basis of odometry data, is also known. It is, however, in this case disadvantageous that the position estimation error, which occurs transversely to the direction of travel of the robot vehicle, grows without bounds as the path length increases so that traversing the entire working area solely on the basis of dead reckoning is equivalent to random navigation.

The aim underlying the invention is to propose a control method for autonomous robot vehicles, in particular for lawn mowing vehicles, which on the one hand can be cost effectively implemented and nevertheless minimizes multiple traverses in comparison to a purely random navigation. As a result of using this optimized control method, in some embodiments, a more beautifully manicured lawn shall result when the robot vehicle is configured as a lawn mowing vehicle. Furthermore, the aim is to propose a correspondingly optimized robot vehicle, in particular a lawn mowing vehicle.

SUMMARY

This aim is met in regard to the control method with the features described in the independent claims and in regard to the robot vehicle with the features described in the independent claims. Advantageous modifications of the invention are stated in the sub-claims. All combinations of at least two of the features disclosed in the description, the claims and/or the figures fall within the scope of the invention. In order to avoid repetitions, features disclosed in accordance with the method shall also apply and be claimable in accordance with the device.

The idea underlying the invention is to carry out the entire mowing operation, i.e. the completion of the working area (working region), in partial steps. In other words, the working area (working region) is broken down into a plurality of sections (surface sections), wherein each section is measured with the help of dead reckoning, thus with the help of odometry data, in such a way that it can be traversed such that two adjoining course sections (lanes) overlap with a particularly predefined or predefinable probability transversely to the direction of travel. The knowledge underlying the invention is that dead reckoning is much more accurate across short distances than a higher-ranking global satellite-based navigation, for example with the help of GPS signals. The driving means of the robot vehicle are therefore controlled in such a way that several sections of the working area are consecutively completed with the robot vehicle, the completion, respectively traversing, of each section taking place with the help of dead reckoning. In so doing, it is a constituent part of a section travel strategy, according to which the individual sections are traversed, that in each case two course sections, which preferably, ideally, run parallel to each other, overlap transversely to the direction of travel. The substantial advantage of the invention is that a more efficient coverage of the working area can be achieved with fewer multiple traverses in comparison to the purely random navigation. If the robot vehicle is then designed as a lawn mowing vehicle with a mowing tool, the mowing pattern is furthermore regular in comparison to random navigation because each section is traversed in accordance with a predefined, in particular regular, movement pattern, which, in some embodiments, includes a plurality of course sections. The total time for completion drops due to the reduction in the multiple traverses. Moreover, the energy consumption is minimized, which is then particularly advantageous if the driving means are designed to be battery driven. By dead reckoning, a navigation system on the basis of odometry data is understood in the simplest case. The pure odometry-data navigation system is supported with the help of inertial sensors, such as acceleration sensors or rotational speed sensors and or through the use of at least one compass.

In a modification to the invention, provision is advantageously made for a (global) travel strategy coordinating the sections to be placed over the section travel strategy, with which the individual sections in preferably at least approximately parallel course sections are traversed. The higher-ranking travel strategy thereby links the individual sections together, preferably in such a way that the sections do not or only slightly overlap. In the simplest case, the higher-ranking travel strategy, as will be explained later, relates to a random strategy (random navigation). Even when configuring the higher-ranking travel strategy as a random navigation strategy, an improvement in the manicured appearance of the lawn is achieved and multiple traverses are minimized vis-à-vis a complete random navigation by virtue of the fact that the robot vehicle travels through a plurality of sections, which in each case have course sections which overlap transversely to the direction of travel of said robot vehicle.

An embodiment is particularly preferred, wherein the section travel strategy is configured in such a way that the driving means are controlled such that a change in direction of the robot vehicle occurs whenever a course section which has just been traversed by the robot vehicle does not overlap a previously traversed course section with the predefined probability. In other words, a section is delimited in the direction of travel because of the fact that a change in direction of the robot vehicle is initiated whenever a coverage, in the ideal case preferably of parallel course sections, is no longer guaranteed with a certain probability. In the simplest case, this relates to a constant, which is dependent upon the error model of the dead reckoning, in reference to the defined path length. It is particularly preferred for a change in direction to already then be initiated if a minimum overlap is no longer guaranteed with a predefined probability. In other words, a modification to the invention advantageously provides that the robot vehicle travels straight ahead so long as two adjoining course sections overlap with a predefined probability transversely to the direction of travel, preferably with a minimum overlap. In order to increase the accuracy of the section navigation, it is possible at standstill, once or several times per section and particularly over an extended period of time, to improve the position estimation of individual positions by averaging over a plurality of satellite positioning results if the satellite-based navigation system is used as the higher-ranking travel strategy which will be explained later on. Overall an improved cross linking of the dimensions of the section when interacting with odometry data and/or the values of the inertial sensors can be achieved via known techniques as, for example, a least square optimization.

The driving means are preferably controlled in such a way that a change in direction of the robot vehicle is initiated whenever a position estimation error, which occurs transversely to the direction of travel of said robot vehicle, no longer lies with a predefined probability, for example 95%, below a limit value. The position estimation error thereby relates to the difference between a position estimation value ascertained by dead reckoning (estimated offset) and the not known, actual position (actual offset) transverse to the direction of travel.

The section travel strategy is preferably algorithmically implemented such that operations are performed with a standard deviation of the position estimation error which is preferably continually ascertained by dead reckoning. In a modification to the invention the respective output of a Kalman filter, which also processes data of additional sensors, e.g. compass and/or rotational speed sensor, in addition to odometry data, is understood by the term standard deviation. As soon as this standard deviation reaches a limit value, a change in direction, in particular a turnaround, of the robot vehicle is initiated. In this connection, the maximum distance to be traversed in one direction within a section up until a turnaround is initiated is selected in such a way that overlapping is guaranteed with selectable probability with the dead-reckoning error model which is presumed to be known. In the simplest case, the path length, which requires a turnaround to be performed, relates to a constant, which is dependent upon the dead-reckoning error model that is particularly well known.

An embodiment is particularly preferred, wherein the limit value, below which the standard deviation of the position estimation error of a course section must remain in order for the robot vehicle to continue traveling straight ahead, is calculated while taking into account the position estimation errors of two adjoining, overlapping course sections (in the case of a sinuous movement pattern: round trip). Taking a normal distribution for the position estimation error and a predefined probability of 95% when a sinuous movement pattern occurs, the following correlation results, for example, for the limit value, which the standard deviation of the position estimation error must reach:

Limit value=Overlap/(2*sqrt(2)).

As soon as a section has been completed, a new section is started. The higher-ranking travel strategy mentioned at the beginning of the application serves in selecting and approaching the new section.

An embodiment is particularly preferred wherein the movement pattern according to the section travel strategy is a sinuous pattern, in which multiple paths of movement, which in the ideal case are parallel, are implemented. In order to approach respectively adjoining course sections, the robot vehicle has to thereby execute a 180 degree turn after each course section.

As a basis of decision-making for when a section has been conclusively traversed, respectively completed, there are several possibilities. The work on a section can thus, for example, be terminated after a predefined time. It is alternatively possible for the work on a section to be concluded after a certain total traveling distance has been traversed. It is particularly preferred if the traversing of a section is then concluded if it is recognized by means of suitable sensors that a border of the working area has been reached and/or if it is recognized by means of suitable sensors than an already traversed section has been reached. In order to meet this objective, suitable sensors, in particular optical ones, monitor whether the ground presently being traversed or the ground to be traversed in the upcoming pass has already been mowed or not. As soon as ground which has already been mowed is detected, the work on a section can be terminated and a starting point of a further section can be approached with the help of the higher-ranking travel strategy.

When the border of the working area or an already completed section is recognized, the work on the section presently being mowed does not necessarily have to be interrupted. It is sufficient if a change in direction is carried out within the section that is presently be worked on.

An embodiment is particularly preferred, wherein, particularly after a section has been worked on, the dimensions (surface extent) of the completed section, particularly with associated accuracies, are stored. These stored data are preferably taken into account in a higher-ranking travel strategy, particularly such that two separate sections do not or only overlap up to a maximum value in order to minimize multiple traverses as much as possible. The stored information serves additionally or alternatively to determine a starting point for a new section.

There are most different options with regard to the concrete configuration of the higher-ranking travel strategy. In the simplest cast, said higher-ranking strategy relates, as previously mentioned, to a random navigation strategy—in other words upon completion of a section the starting point of the next section is randomly selected. In the case of this random navigation, the degree of completion of the working area is preferably taken into account pursuant to the section travel strategy. In other words, the work on a section is terminated as soon as it has been determined that the section just traversed overlaps (at least for the most part) another section.

An embodiment is particularly preferred, wherein the higher-ranking travel strategy is one based on satellite navigation. In so doing, accuracies with a margin of error less than 3 meters and with the help of differential correction signals such as WAAS/EGNOS or of a stationary second receiver, which, for example, is installed in a base station, and also in some cases accuracies with a margin of error less than a meter can be realized. An embodiment is thereby particularly preferred, wherein the sections which have already been worked on, in particular those having area dimensions which were pessimistically estimated, are charted (taken into consideration) on a map of the working area. A digital map does not thereby have to necessarily be a graphic configuration. It can in fact in the simplest of embodiments relate to coordinates of the working area stored particularly in tables. If, for example, the error is estimated to be 1 meter of edge distance, a rectangle having the coordinates (1,1) to (9,5) then evolves from a rectangular area of the section having the coordinates (0,0) to (10,6).

As an alternative to or in addition to the use of a satellite-based, higher-ranking navigation system, it is possible to implement a visual navigation to support the higher-ranking travel strategy. In the case of this modification to the embodiment, the robot vehicle is equipped with a camera, in particular a panoramic camera. Said robot vehicle can then take and store a picture, particularly at an open border of a section. Said robot vehicle can now approach an area, which has not yet been worked on, i.e. an unworked section on the working area, by means of known methods of visual homing. This can, for example, be implemented by the driving means of said robot vehicle being so actuated that the difference between images is minimized in terms of the sum of squared differences. In this way, it is possible to navigate within a section (image section) with a high degree of accuracy. Especially if the proximity relationship between sections is stored, it is possible to also navigate between sections; thus enabling all places which have not yet been worked on to be traversed until a complete coverage has been achieved. As an alternative to or in addition to taking a picture, an additional sensor can be used, for example a laser sensor or an ultrasonic sensor.

As previously described in connection with the satellite-based, higher-ranking travel strategy, it is possible to plot the sections which have already been completed on a digital map, preferably with a surface extent estimated pessimistically, so that, for example, a peripheral edge of a certain width, for example of 1 m, is subtracted from the calculated section. As an alternative to or in addition to the pessimistically estimated error, a probabilistic digital coverage map of the working area can be created, which will indicate what the probability is that certain locations have already been traversed. In this way, sections, which in all likelihood have already been completed, can be identified. After completing a section, it is then possible to begin work on a new section, which in all likelihood has not already been completed. Also in this regard, the areas designated as open between the charted sections are preferably used as possible destinations. In so doing, these destinations are also displaced toward the inside on the basis of a pessimistic estimate of the area of the sections which have already been completed.

The invention also leads to an autonomously working robot vehicle, in particular to a lawn mowing vehicle. An embodiment is thereby particularly preferred, wherein the robot vehicle is designed such that a previously described control method can be implemented therewith. The robot vehicle therefore has drive means, which are designed to be used in combination with a section travel strategy having a higher-ranking travel strategy.

BRIEF DESCRIPTION OF THE DRAWINGS

Additional advantages, features and details of the invention ensue from the following description of preferred exemplary embodiments as well with the aid of the drawings.

Said drawings show in:

FIG. 1a a movement pattern of a section travel strategy for traversing a section of a working area in a schematic depiction, FIG. 1b the course of the standard deviation of the position estimation error for the at least approximately parallel course sections of the movement pattern from FIG. 1a and FIG. 2 a section, which is traversed using a sinuous strategy, plotted on a digital map of the working area, the surface extent of said section, which is ascertained with the help of satellite navigation, being taken into account only as a pessimistic estimation.

DETAILED DESCRIPTION

Elements which are the same and elements having the same function are labeled in the figures with the same reference numerals.

In FIG. 1a, a section 2 is schematically depicted in a sectional Cartesian coordinate system 1 (x', y'). A robot vehicle 3 travels through said section 2 according to a section travel strategy with a sinuous movement pattern 4. The movement pattern 4 comprises a plurality of course sections 5 which are substantially parallel to each other, wherein two adjoining course sections 5 are in each case connected to each other via in each case a 180 E turnaround 6 (turnaround course section). The direction of travel of the robot vehicle 3 along the course sections 5 takes place along the x' axis. A position estimation error in the y' direction, i.e. transversely to the direction of travel, is continually ascertained by dead reckoning—likewise the associated standard deviation std ($\Delta y$).

The distance d is plotted on the x' axis, whereat the robot vehicle 3 turns while effecting an offset b, which is not plotted, to the previously traversed course section 5 and begins the next course section 5 in the opposite direction. In the simplest case, the distance d relates to a constant, which is dependent upon the error model of the robot dead reckoning system. The distance d results from a consideration of the standard deviation std ($\Delta y$), as this is plotted in FIG. 1b, while taking a predefined overlap b into account. It can be seen that the standard deviation std ($\Delta y$) increases linearly in each course section up until a limit value G. Upon reaching the limit value G, the distance d has been traveled and a turnaround of the robot vehicle 3 is initiated. In the case of the sinuous movement pattern 4 shown and a given overlap b, the limit value G is calculated such that an overlapping of two adjoining course sections 5 is ensured with a probability of 95% in this instance. Taking a normal distribution as a basis, the limit value G corresponds to:

$$G=b/(2*\mathrm{sqrt}(2)).$$

When taking other probabilities as a basis, limit values result which are correspondingly adapted.

A digital map 7 of a working area to be traversed with the help of the robot vehicle 3 is shown in FIG. 2. The digital map is based on the Cartesian coordinate system x, y, in which the section 2 with its sectional coordinate system 1 (x', y') is plotted. A section 2 traversed with the help of the robot vehicle 3 is delineated in the digital map 7 of the working area 8. In the process, only the pessimistic surface extent of the section 2, which is identified with the reference numeral 2', is stored. Said surface extent 2' is ascertained by subtracting an edge strip with a predefined lateral extension.

After completing the section 2, another section, which is not shown, is approached by means of a higher-ranking travel strategy. This is based, for example, on a random navigation system and/or is satellite based and/or based on a visual navigation system, in particular while taking a panoramic camera, which is an integrated part of the robot vehicle 3, into account.

The invention claimed is:

1. Control method for controlling driving means which are designed to steer and move a robot vehicle that is designed as a lawn mowing vehicle, the method comprising:

controlling the driving means to cause the robot vehicle to travel through several sections of a working area in each case in a specific movement pattern according to a section travel strategy with the help of dead reckoning such that in each case two adjoining course sections overlap with a predefined probability transversely to the direction of travel of the robot vehicle, wherein the position of the sections on the working area is set with the help of a higher-ranking travel strategy, wherein the higher-ranking travel strategy comprises at least one of: a random navigation system, a satellite system, and a visual navigation system, wherein the driving means are controlled according to the section travel strategy, wherein a change in direction takes place when a standard deviation reaches a limit value, and wherein the limit value is calculated on the basis of a predefined probability, a predefined overlap of the adjoining course sections, and the sum of position estimation errors of the adjoining course sections.

2. The control method according to claim 1, wherein the driving means are further controlled according to the section travel strategy in such a way that a change in direction of the robot vehicle takes place as soon as a first course section of the two adjoining course sections presently being traversed by the robot vehicle and a second course section of the two adjoining course sections completed prior to the aforementioned course section no longer overlap with the predefined probability.

3. The control method according to claim 1, wherein the drive means are further controlled according to the section travel strategy in such a way that a change in direction of the robot vehicle takes place if a position estimation error, which occurs transversely to the direction of travel of the robot vehicle, no longer lies below a limit value with a predefined probability.

4. The control method according to claim 1, wherein a movement pattern is sinuous according to the section travel strategy and in that a change in direction is carried out as a 180 degree turn.

5. The control method according to claim 1, wherein the travel on a section is concluded if a predefined path length was traversed or if a predefined travel time has elapsed or if a border of the working area is reached or if a section already traversed is reached.

6. The control method according to claim 1, wherein the higher-ranking travel strategy is a random navigation strategy.

7. The control strategy method according to claim 1, wherein the higher-ranking travel strategy is a satellite-navigation based travel strategy.

8. The control method according to claim 1, wherein a higher-ranking travel strategy is a visual navigation strategy employing at least one panoramic camera.

9. The control method according to claim 1, wherein the sections are plotted in a digital map with a surface extent that has been estimated.

10. The control method according to claim 1, wherein a digital probabilistic coverage map of the working area is created, which indicates with what likelihood regions of the working area have already been traversed.

11. Robot vehicle having control means, which are designed for carrying out the method according to claim 1, for controlling the driving means which are designed to steer and move the robot vehicle, the control means being designed in such a way that they control the driving means such that the robot vehicle travels through several sections of the working area in each case in the specific movement pattern according to the section travel strategy with the help of dead reckoning such that in each case two adjoining course sections overlap with a minimum probability transversely to the direction of travel of said robot vehicle.

* * * * *